(12) United States Patent
Sarris

(10) Patent No.: US 8,804,804 B1
(45) Date of Patent: Aug. 12, 2014

(54) ESTIMATION AND COMPENSATION FOR CARRIER FREQUENCY OFFSET AND SAMPLING CLOCK OFFSET IN A COMMUNICATION SYSTEM

(71) Applicant: Antcor S.A., Athens (GR)

(72) Inventor: Ioannis Sarris, Athens (GR)

(73) Assignee: Antcor S.A. (GR)

( * ) Notice: Subject to any disclaimer, the term of this patent is extended or adjusted under 35 U.S.C. 154(b) by 0 days.

(21) Appl. No.: 13/852,376

(22) Filed: Mar. 28, 2013

(51) Int. Cl.
*H03H 7/30* (2006.01)
*H03H 7/40* (2006.01)
*H04L 7/00* (2006.01)

(52) U.S. Cl.
CPC .................. *H04L 7/0016* (2013.01)
USPC ............ 375/229; 708/300; 708/819; 375/330

(58) Field of Classification Search
USPC ........................................................ 375/229
See application file for complete search history.

(56) References Cited

U.S. PATENT DOCUMENTS

| | | | |
|---|---|---|---|
| 6,959,050 B2 | 10/2005 | Baum et al. | |
| 7,729,238 B2 | 6/2010 | Shin et al. | |
| 7,773,690 B2 | 8/2010 | Hoo et al. | |
| 7,778,338 B2 | 8/2010 | Ma et al. | |
| 7,843,806 B2 | 11/2010 | Wang et al. | |
| 7,957,499 B2 | 6/2011 | Hwang et al. | |
| 8,019,036 B2 | 9/2011 | Voltz et al. | |
| 8,218,665 B2 | 7/2012 | Chin et al. | |
| 2002/0159540 A1* | 10/2002 | Chiodini | 375/316 |
| 2004/0264584 A1 | 12/2004 | Labs et al. | |
| 2005/0193047 A1* | 9/2005 | Fu et al. | 708/300 |
| 2007/0053462 A1 | 3/2007 | Pirooz et al. | |
| 2011/0044408 A1* | 2/2011 | Ahmad | 375/340 |

* cited by examiner

*Primary Examiner* — Erin File
(74) *Attorney, Agent, or Firm* — Westberg Law Offices

(57) ABSTRACT

A system for estimating clock frequency offset and sampling clock offset in a communication system is provided. A receiver is configured to receive a communication signal having been transmitted from a transmitter via a communication channel. The receiver has a signal processor, wherein the signal processor is configured to generate an estimate of a carrier frequency offset and an estimate of a sampling clock offset from the received communication signal by: extracting a vector of pilot symbols from the received signal; performing equalization on the pilot symbols; performing clock frequency offset and sampling clock offset compensation on the pilot symbols; generating the estimate of a carrier frequency offset by estimating a common phase rotation using a first Taylor series approximation; and generating the estimate of the sampling clock offset by estimating phase differences between pairs of pilot symbols using a second Taylor series approximation.

29 Claims, 5 Drawing Sheets

ESTIMATION AND COMPENSATION FOR CARRIER FREQUENCY OFFSET AND SAMPLING CLOCK OFFSET IN A COMMUNICATION SYSTEM

BACKGROUND OF THE INVENTION

The present invention relates to estimating and compensating for carrier frequency offset (CFO) and sampling clock offset (SCO) in a communication system.

Orthogonal frequency division multiplexing (OFDM) is a method of encoding information onto carrier signals. OFDM is being employed increasingly in wireless communication systems such as wireless local area networks (WLAN) and cellular communications systems. In an OFDM system, information in the form of data symbols is encoded onto multiple frequency division multiplexed carrier signals. A cyclic prefix can be appended to the symbols to serve as a guard interval against inter-symbol interference and to assist in frequency domain processing of the received signals. Recovery of the transmitted data at a receiver involves demodulating the carrier signals to baseband and digitally sampling the demodulated baseband signals.

Carrier frequency offset (CFO) refers to a difference between a frequency used to modulate information onto a carrier signal at a transmitter and a frequency used to demodulate the signal at a receiver. Typically, these frequencies are generated by different crystal oscillators located at both the transmitter and the receiver. While the oscillators may operate at similar frequencies, they are generally not perfectly matched. Sampling clock offset (SCO) refers to an offset between a time at which a sample is obtained and an optimal sampling point. While individual samples may not be adversely affected by a small sampling offset, the effects of SCO tend to be cumulative such that sampling errors can eventually occur. Therefore, in order to accurately and reliably recover encoded information, it is important to appropriately account for both CFO and SCO.

Frequency-domain CFO and SCO estimation methods typically performed in OFDM systems involve calculation of the inverse tangent (a tan). Moreover, methods performed for CFO and SCO compensation typically involve calculation of the exponential function (exp). These calculations are of high computational complexity, and are performed for each received symbol. As such, they tend to increase receiver system complexity and introduce undesirable latency in processing the received signal.

SUMMARY OF THE INVENTION

The present invention provides systems for and methods of estimating and compensating for carrier frequency offset and sampling clock offset in a communication system. In an embodiment, a system for estimating clock frequency offset and sampling clock offset in a communication system is provided. A receiver is configured to receive a communication signal having been transmitted from a transmitter via a communication channel. The receiver has a signal processor, wherein the signal processor is configured to generate an estimate of a carrier frequency offset and an estimate of a sampling clock offset from the received communication signal by: extracting a vector of pilot symbols from the received signal; performing equalization on the pilot symbols; performing clock frequency offset and sampling clock offset compensation on the pilot symbols; generating the estimate of a carrier frequency offset by estimating a common phase rotation using a first Taylor series approximation; and generating the estimate of the sampling clock offset by estimating phase differences between pairs of pilot symbols using a second Taylor series approximation.

This and other embodiments are described herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

Carrier frequency offset (CFO) and sampling clock offset (SCO) are products of the frequency offset between the internal clocks in a wireless (RF) transmitter and receiver. As used herein, the term CFO/SCO refers to the combined effects of CFO and SCO. The effect of these offsets is detrimental to the quality of the received signal and therefore their estimation and compensation is useful to achieve high reliability and high-throughput communications. This invention increases the accuracy of the estimation and compensation and/or lowers the complexity of the estimation and compensation mechanisms. In accordance with an embodiment of the present invention, Taylor series approximation is utilized to approximate the inverse tangent function and to thereby generate estimated values for CFO and SCO. In accordance with another embodiment of the present invention, Taylor series approximation is utilized to approximate the exponential function and to thereby perform CFO/SCO compensation. In accordance with a further embodiment of the present invention, CFO/SCO compensation is performed on pilot symbols prior to estimating values for CFO and SCO. Performing pilot symbol CFO/SCO compensation is advantageous because it allows the Taylor series approximation to sufficiently estimate values for CFO and SCO with small order. In accordance with yet another embodiment of the present invention, CFO/SCO compensation is performed on data symbols using a compensation vector that is computed using Taylor series approximation and the values estimated for CFO and SCO. While embodiments of the present invention are described herein in the context of OFDM communication systems, this is not intended to be limiting; rather, it will be apparent that embodiments of the present invention can be applied to other types of communication systems.

Figure 1:
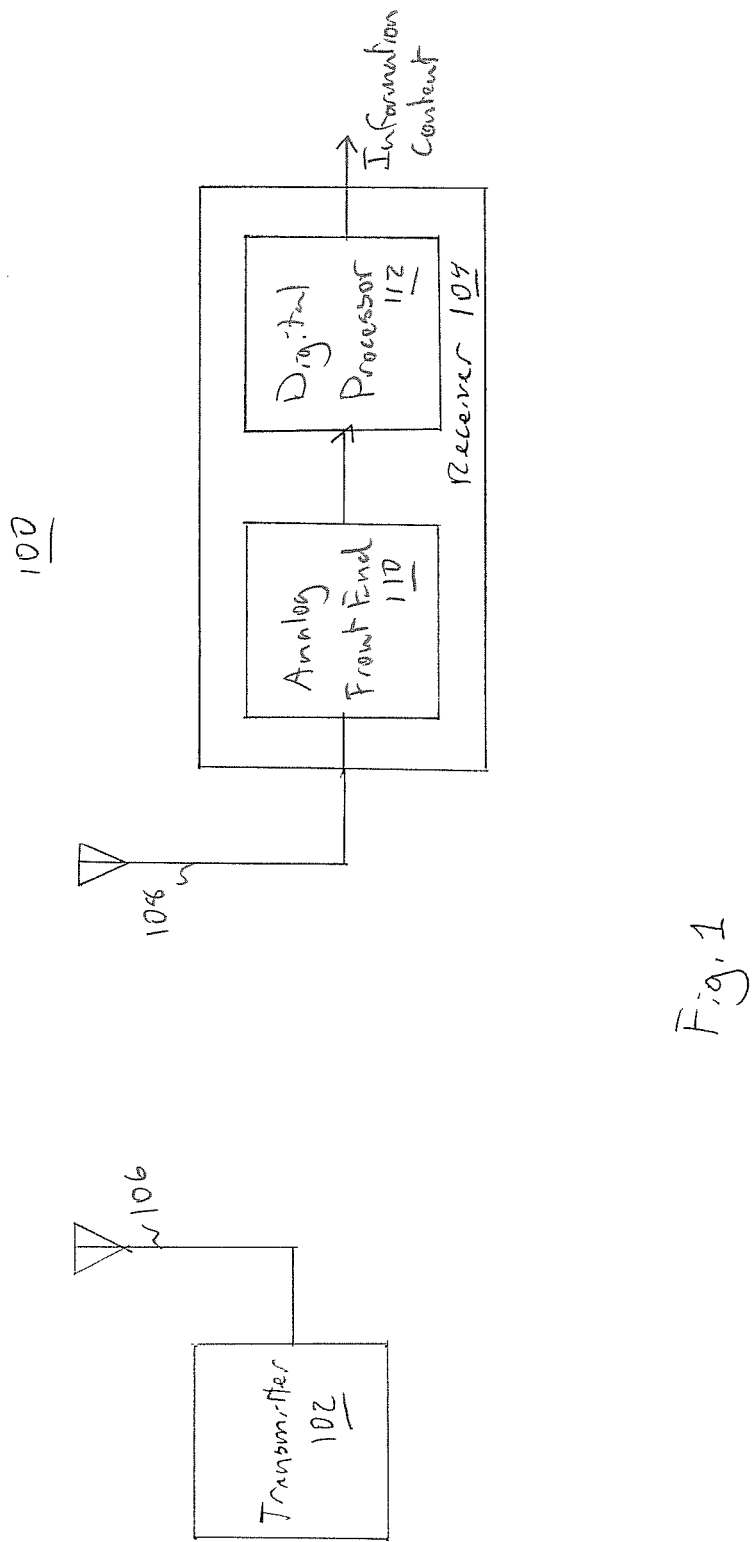
FIG. 1 illustrates a block schematic diagram of a communication system in accordance with an embodiment of the present invention.

FIG. 1 illustrates a block schematic diagram of a communication system 100 in accordance with an embodiment of the present invention. A transmitter 102 transmits a wireless radio frequency (RF) communication signal to a receiver 104 via a communication channel. The transmitter 102 transmits the communication signal via one or more transmit antennas 106. The receiver 104 receives the communication signal via one or more receive antennas 108. Multiple transmit and receive antennas can be employed, for example, for multiple-input and multiple-output (MIMO) modulation schemes. FIG. 1 illustrates a simplex (i.e. one-way) communication system; however, it will be apparent that the communication system can be duplex (i.e. two-way) by providing a transmitter and receiver at each end.

The receiver 104 can include an analog front end signal processor 110 and a digital signal processor 112. The communication signal can be, for example, a wireless communication signal that is encoded in accordance with orthogonal frequency division multiplexing (OFDM). The analog front end 110 receives the communication signal, demodulates the signal and samples the demodulated signal to form a series digital samples (i.e. analog-to-digital conversion). The analog front end 110 can also perform filtering, amplification and other analog signal processing techniques prior to digitally sampling the received signal.

The digital signal processor 112 processes the digital signal samples formed by the analog front end 110 to extract information encoded onto the received communication signal.

Figure 2:
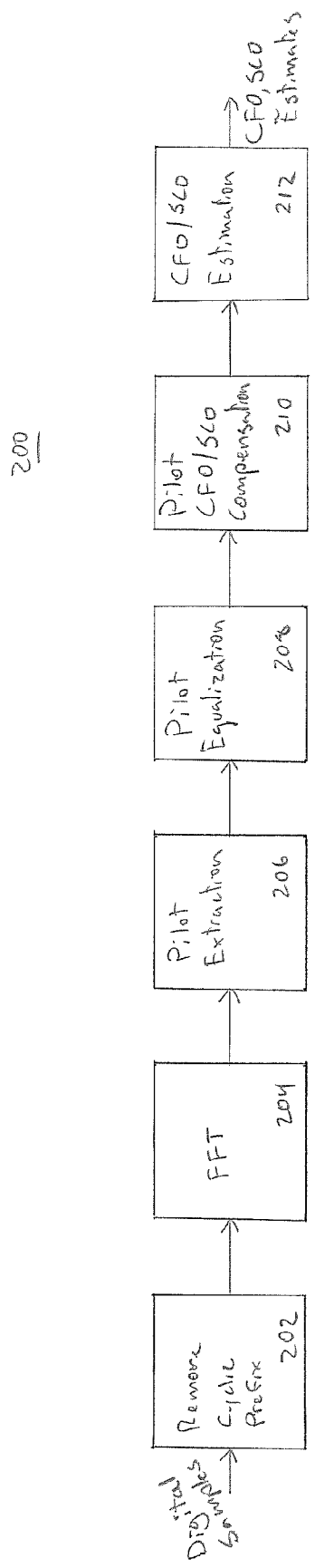
FIG. 2 illustrates a block schematic diagram of a system for estimating carrier frequency offset (CFO) and sampling clock offset (SCO) in accordance with an embodiment of the present invention.

FIG. 2 illustrates a block schematic diagram of a system 200 for estimating carrier frequency offset and sampling clock offset in accordance with an embodiment of the present invention. The system 200 can be included in the digital signal processor 112 illustrated in FIG. 1. Input to block 202 is a series of digital samples which can be in the form of a vector of ($N_{FFT}+N_{CP}$) time-domain symbols, where $N_{FFT}$, $N_{CP}$, can vary and correspond to the number of symbols in a particular communication sequence. These digital samples can be received from the analog front end 110 (FIG. 1). The block 202 removes $N_{CP}$ consecutive samples, which correspond to a cyclic prefix, from the beginning of each communication symbol. The symbols can be formatted in accordance with OFDM communication protocols.

A vector of $N_{FFT}$ samples which correspond to an ODFM symbol without the prefix, is input to block 204. The block 204 performs a Fast Fourier Transformation (FFT) to convert the symbols from time domain to frequency domain.

A vector of $N_{FFT}$ frequency-domain samples is input to block 206. The block 206 extracts the $N_P$ frequency-domain pilot symbols (usually $N_P \ll N_{FFT}$).

The vector of ($N_P$) frequency-domain pilot symbols is input to block 208. The block 208 performs equalization of the pilot symbols. This can be accomplished by multiplying the pilot symbols with a pre-calculated vector or matrix of equalization coefficients. The equalization coefficients can be the inverse of channel estimation coefficients. The channel estimation coefficients can be generated, for example, by a conventional channel estimator based on received reference symbols. The block 208 provides at its output an estimate of the transmitted pilot symbols N.

Block 210 performs CFO/SCO compensation. This compensation is preferably based on estimates from previous symbols. The block 210 can be bypassed for the first symbol of a particular communication sequence. Particular compensation methods are discussed herein, however, the block 210 can implement any valid compensation mechanism. For example, CFO/SCO compensation can be performed in accordance with conventional methods that involve calculation of the exponential function (exp). Alternatively, CFO/SCO compensation can be performed in block 210 in accordance with methods described in connection with FIG. 4 or 5, below.

Block 210 can be positioned before block 208, however, on systems with multiple (e.g. $N_{RX}$) receive antennas, it is preferred for block 210 to be positioned after block 208. This is so that compensation is applied only to the ($N_{SS}$) vectors of spatial streams rather than the ($N_{RX}$) vectors of receive antennas. This reduces complexity in cases where ($N_{SS}<N_{RX}$) while maintaining the same complexity in cases where ($N_{SS}=N_{RX}$).

Block 212 estimates the phase angles of CFO and SCO for each symbol. The input to block 212 is a set of equalized pilot symbols. These equalized pilot symbols are expected to have only a residual CFO/SCO because the compensation performed in block 212 is expected to remove most of the phase error caused by CFO/SCO. Therefore, an approximation operation can be applied for both the CFO and SCO estimations. An example approximation of the phase angles $\phi$ and $\theta$ respectively is as follows:

$$\angle z = a\tan\left(\frac{\text{imag}(z)}{\text{real}(z)}\right) \approx \left(\frac{\text{imag}(z)}{\text{real}(z)}\right)$$

Specifically, common phase rotation is estimated to determine $\phi$ (CFO) and phase differences between pairs of pilot symbols is estimated to determine $\theta$ (SCO).

In cases of low SNR, it is possible that the previous estimation yields inaccurate results because, in some noise-corrupted symbols real(z)≈0. To reduce the effect of this problem, the output from the approximate angle operation can be hard-limited to a predetermined range (e.g. $-0.5<\phi$, $\theta<0.5$).

An estimate of zeroth order, as in the approximation above, is expected to provide sufficient accuracy. However, it will be apparent that higher order estimation can be employed. For example, a higher order Taylor series approximation can be employed in place of the a tan function to compute the phase angle and to thereby estimate CFO and SCO. For example, the phase angle can be computed using the following Taylor series estimation:

$$\arctan x = \sum_{n=0}^{\infty} \frac{(-1)^n}{2n+1} x^{2n+1} \text{ for } |x| \leq 1, x \neq \pm i$$

The accuracy of the above approximations depends on the value of x and for scenarios where x is small, the accuracy is very high even at low orders (e.g. between zeroth and third orders). It is expected that x will be sufficiently small in most cases because the equalized pilot symbols are expected to have only a residual CFO/SCO. Thus, in accordance with an embodiment of the present invention, compensation is applied to the pilot symbols before a residual CFO/SCO is estimated. This reduces calculation complexity and latency.

The estimation outputs from block 212 are estimated values of the residual CFO and SCO ($\phi$ and $\theta$ respectively).

Figure 3:
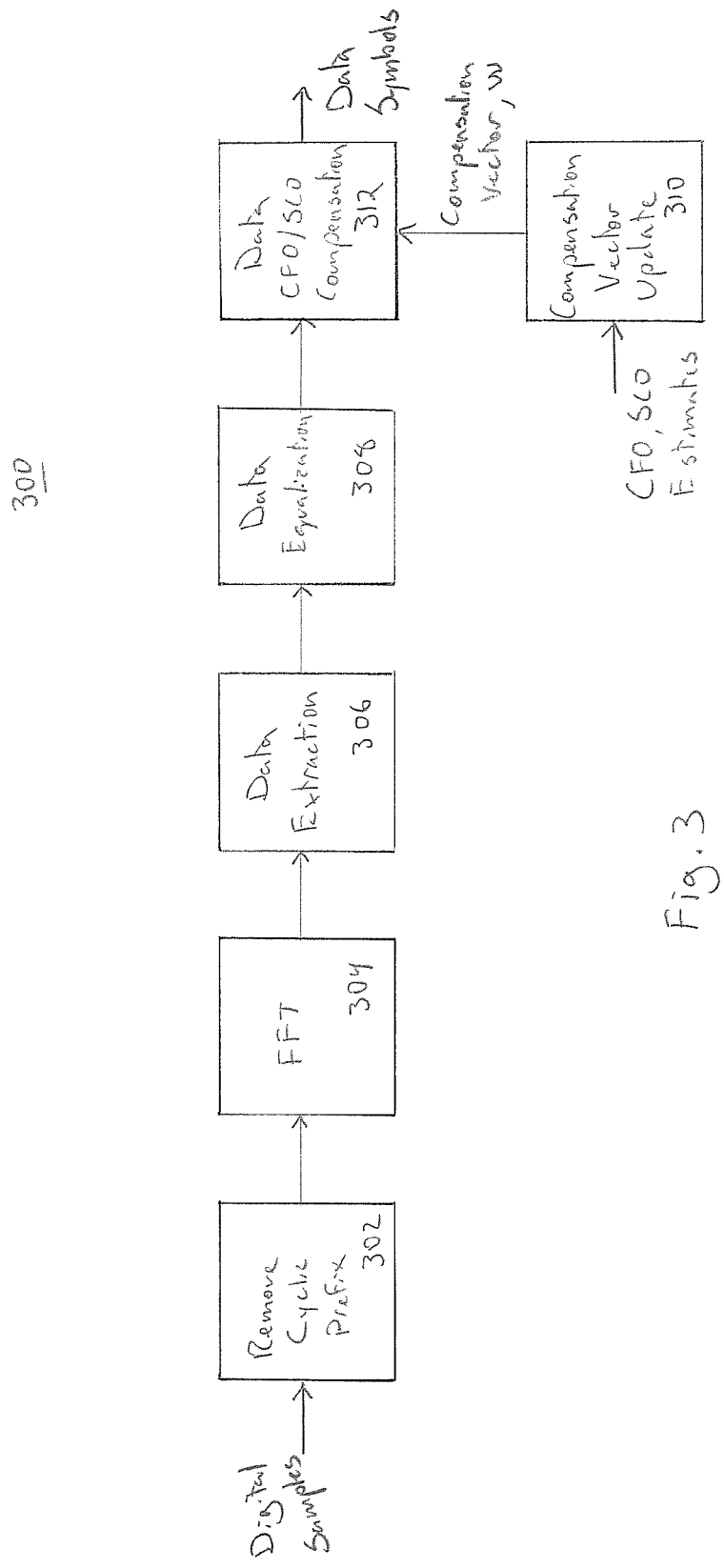
FIG. 3 illustrates a block schematic diagram of a system for compensating for CFO and SCO in accordance with an embodiment of the present invention.

FIG. 3 illustrates a block schematic diagram of a system 300 for compensating for carrier frequency offset and sampling clock offset in accordance with an embodiment of the present invention. The system 300 can be included in the digital signal processor 112 illustrated in FIG. 1. Input to block 302 is a series of digital samples which can be in the form of a vector of ($N_{FFT}+N_{CP}$) time-domain symbols. The block 302 removes $N_{CP}$ consecutive samples, which correspond to a cyclic prefix, from the beginning of each communication symbol. The block 302 can function as described in connection with the block 202 (FIG. 2). As before, the symbols can be formatted in accordance with OFDM communication protocols.

A vector of $N_{FFT}$ samples, which corresponds to the symbols without their prefixes, is input to block 304. The block 304 performs a Fast Fourier Transformation (FFT) to convert the symbols from time domain to frequency domain. The block 304 can function as described in connection with the block 204 (FIG. 2).

A vector of $N_{FFT}$ frequency-domain samples is input to block 306. The block 306 extracts the $N_D$ frequency-domain data symbols ($N_D + N_P \leq N_{FFT}$). Assuming that there are no guard bands and DC subcarriers, then $N_D + N_P = N_{FFT}$.

The vector of ($N_D$) frequency-domain data symbols is input to block 308. The block 308 performs equalization on the data symbols. This can be accomplished by multiplying the data symbols with a pre-calculated vector of equalization coefficients. In the case of MIMO, this can be a pre-calculated matrix of equalization coefficients. The equalization coefficients can be the inverse of channel estimation coefficients. The channel estimation coefficients can be generated, for example, by a conventional channel estimator using received reference symbols. The block 308 provides at its output an estimate of the $N_D$ transmitted data symbols.

A compensation vector update block 310 receives as input a set of previously estimated angles $\phi$, $\theta$ corresponding to the residual CFO and SCO for the current OFDM symbol. These can be the estimated angles $\phi$, $\theta$ generated by the block 212 (FIG. 2). The block 310 generates a compensation vector w for each symbol. This can be accomplished as follows:

For a first symbol of a particular communication sequence, the compensation vector w can be initialized as follows:

$$w_0(m) = 1 \text{ for } 0 =< m < N_d$$

In subsequent symbols, the vector w can be updated as follows $$w_p(m) = w_{p-1}(m) \cdot e^{-j(\phi + \theta k)}$$

Since the angles $\theta$, $\phi$ are expected to be small, the following Taylor series approximation can be utilized for the exponential function:

$$e^{j\psi} \approx 1 + j\psi - \frac{\psi^2}{2} + \ldots$$

For most cases, a second or third order Taylor series approximation is expected to be sufficiently accurate. It will be apparent, however, that a lower or higher order approximation can be employed.

Block 312 receives as input the set of equalized data symbols from block 308 and the compensation vector from block 310. The block 312 performs multiplication of the equalized data symbols from block 312 with the corresponding compensation vector w from block 310. A sequence of compensated data symbols y can be output from the block 312.

The pilot CFO/SCO compensation block 210 described previously can also implement this method to avoid the computationally expensive exp operation. This is described in more detail in FIG. 4.

Figure 4:
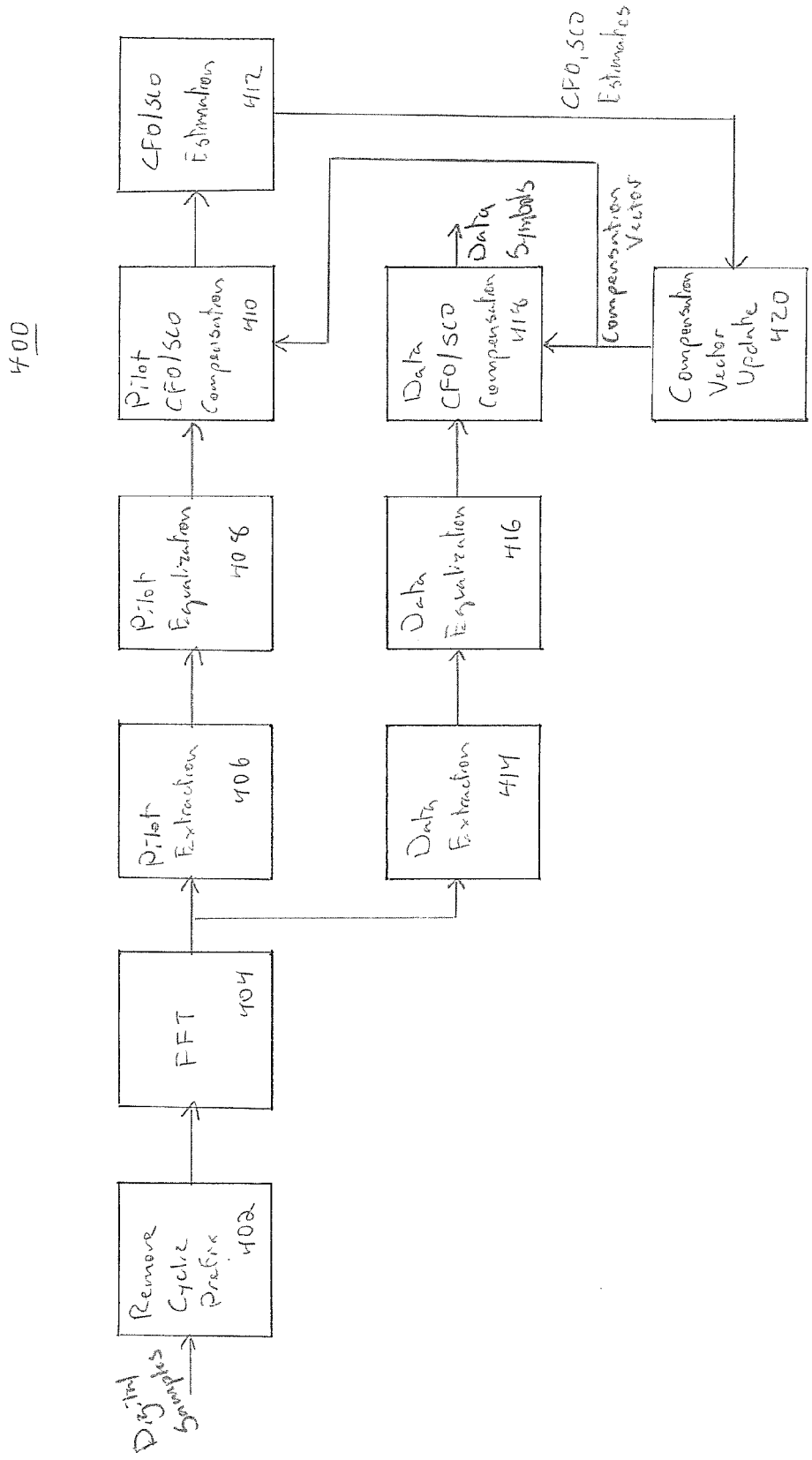
FIG. 4 illustrates a block schematic diagram of a system for estimating and compensating for CFO and SCO in accordance with an embodiment of the present invention.

FIG. 4 illustrates a block schematic diagram of a 400 system for estimating and compensating for carrier frequency offset and sampling clock offset in accordance with an embodiment of the present invention. The system 400 can be included in the digital signal processor 112 illustrated in FIG. 1. Input to block 402 is a series of digital samples which can be in the form of a vector of ($N_{FFT} + N_{CP}$) time-domain symbols.

Block 402 removes $N_{CP}$ consecutive samples, which correspond to a cyclic prefix, as described in connection with the block 202 (FIG. 2).

Block 404 performs a Fast Fourier Transformation (FFT) to convert the symbols from time domain to frequency domain, as described in connection with the block 204 (FIG. 2).

Block 406 extracts the $N_P$ frequency-domain pilot symbols, as described in connection with the block 206 (FIG. 2).

Block 408 performs equalization on the pilot symbols, as described in connection with the block 208 (FIG. 2).

Block 410 performs CFO/SCO compensation, as described in connection with the block 208 (FIG. 2) or as described in connection with the block 312 (FIG. 3) or as described more fully below.

Block 412 estimates the phase angles of CFO and SCO for each symbol, described above in connection with the block 212 (FIG. 2).

The vector of $N_{FFT}$ of frequency-domain symbols from the block 404 is input to a block 414. The block 414 extracts the $N_D$ frequency-domain data symbols ($N_D + N_P \leq N_{FFT}$), as described in connection with the block 306 (FIG. 3).

Block 416 performs equalization on the data symbols, as described in connection with the block 308 (FIG. 3).

Block 418 receives as input the set of equalized symbols from block 416 and a compensation vector from block 420. The block 418 performs compensation on the data symbols by performing multiplication of the equalized data symbols from block 418 with the corresponding compensation vector w from block 420. As shown in FIG. 4, the pilot compensation block 410 can also receive the compensation vector w. In this case, the pilot compensation block 410 performs compensation on the pilot symbols by performing multiplication of the equalized pilot symbols from block 408 with the corresponding compensation vector w from block 420.

Compensation vector update block 420 receives as input the set of previously estimated angles $\phi$, $\theta$ corresponding to the residual CFO/SCO for the current OFDM symbol from the CFO/SCO estimation block 412 and updates the compensation vector w, as described above in connection with block 310 (FIG. 3). A sequence of compensated data symbols y can be output from the block 418.

Figure 5:
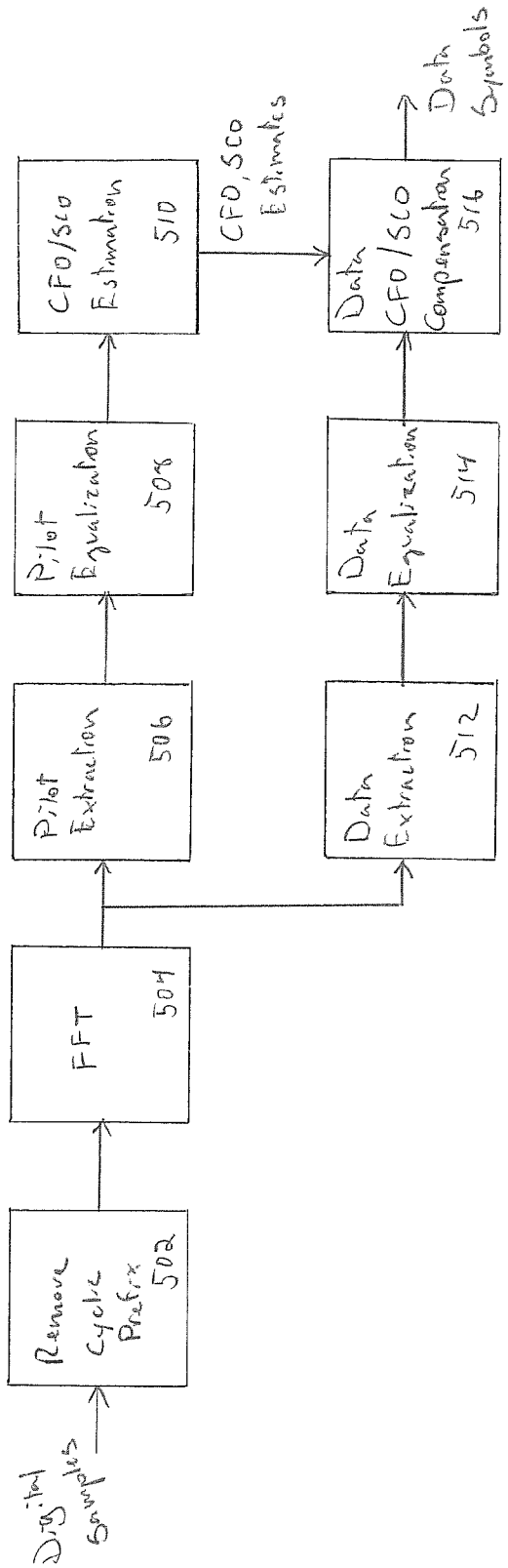
FIG. 5 illustrates a block schematic diagram of a system for estimating and compensating for CFO and SCO in accordance with an alternative embodiment of the present invention.

FIG. 5 illustrates a block schematic diagram of a system 500 for estimating and compensating for carrier frequency offset and sampling clock offset in accordance with an alternative embodiment of the present invention. The system 500 can be included in the digital signal processor 112 illustrated in FIG. 1. Input to block 502 is a series of digital samples which can be in the form of a vector of ($N_{FFT} + N_{CP}$) time-domain symbols.

Block 502 removes $N_{CP}$ consecutive samples, which correspond to a cyclic prefix, as described in connection with the block 202 (FIG. 2).

Block 504 performs a Fast Fourier Transformation (FFT) to convert the symbols from time domain to frequency domain, as described in connection with the block 204 (FIG. 2).

Block 506 extracts the $N_P$ frequency-domain pilot symbols, as described in connection with the block 206 (FIG. 2).

Block 508 performs equalization on the pilot symbols, as described in connection with the block 208 (FIG. 2).

Block 510 performs CFO/SCO estimation. The block 510 estimates the phase angles of CFO and SCO for each symbol using the equalized pilot symbols from block 508. The input to block 510 is a vector of ($N_p$) equalized frequency-domain symbols that have a phase shift which corresponds to the CFO/SCO between the transmitter and the receiver. The CFO estimator of block 510 can generate an estimate for CFO, $\Phi$ by summing or averaging the values of all pilot symbols and calculating the angle (a tan) of the outcome from the above operation to find a common phase rotation (this is the CFO estimate, $\Phi$). To estimate the SCO, phase differences between pairs of pilot symbols is estimated. Therefore, the SCO estimator of block 510 can calculate a set of values as $$Z(k,n)=p(k)*\text{conj}(p(n)), \text{ where } k\sim=n, \text{ and } k,n<N_p$$

Then, Z(k, n) is divided by d(k, n) where d(k, n) is the distance (in number of subcarriers) between the positions of pilots p(k) and p(n). The values of Z(k, n)/d(k, n) are averaged (or summed) over all or over a subset of all the valid pairs of (k, n). The angle (a tan) of the outcome from the previous step is calculated (this is the SCO estimate $\Theta$).

The vector of $N_{FFT}$ frequency-domain symbols from the block 504 is input to a block 512. The block 512 extracts the $N_D$ frequency-domain data symbols ($N_D+N_P<=N_{FFT}$), as described in connection with the block 306 (FIG. 3).

Block 514 performs equalization on the data symbols, as described in connection with the block 308 (FIG. 3).

Block 516 receives as input the set of equalized data symbols from block 514 and the CFO and SCO estimates from the block 510. The block 516 performs compensation on the data symbols and outputs a set of phase compensated data symbols.

This block implements the multiplication of each data symbol (y) with a common phase offset (CFO, $\Phi$) and a phase offset related to the subcarrier index (k) in the OFDM symbol (SCO, $\Theta$) to form a CFO/SCO-corrected data symbol (y'). This can be expressed mathematically as follows:

$$y'=y \cdot e^{-j(\phi+\theta k)}$$

In a simple form, where no guard bands exist in the OFDM symbol the values of k are given below:

$$k=[-N_{FFT}/2, -N_{FFT}/2+1, \ldots, N_{FFT}/2-1]$$

It should be note that in the equation above, k corresponds to the subcarrier position index. If, it is assumed that there are no guard and pilot subcarriers, the value of k ranges between $-N_{FFT}/2$ and $N_{FFT}/2-1$. For the case of $N_{FFT}=64$, representing 64 subcarriers, then:

$$k=-32, -31, \ldots, 30, 31$$

Therefore, in order to perform this compensation, 64 exp calculations are needed. In accordance with an embodiment of the present invention, the equation above is reformulated as follows:

$$y'=y \cdot e^{-\phi} \cdot e^{-j\theta k}$$

It would be expected that $N_{FFT}+1$ exp calculations would be required to perform this operation. However, because the values of k are symmetric around zero, $N_{FFT}/2+1$ exp calculations are required to perform the above operation. This is because the exp function for half of the values of k (e.g. for k<0) can be determined from the other half (for k>0) by a computationally inexpensive conjugate operation:

$$e^{jk}=\text{conj}(e^{-jk}).$$

A further embodiment of the present invention involves the use of subcarrier grouping. Because the SCO angle between consecutive OFDM symbols is expected to be small, it is not necessary to calculate compensation values for all values of k; rather, some compensation values can be reused for neighboring subcarriers. For example, the following compensation vector w with 64 entries and 64 exp calculations may be utilized:

$$w=[e^{j\theta \cdot 32}, e^{j\theta \cdot 31}, e^{j\theta \cdot 30}, e^{j\theta \cdot 29}, e^{j\theta \cdot 28}, e^{j\theta \cdot 27}, e^{j\theta \cdot 26}, e^{j\theta \cdot 25}, e^{j\theta \cdot 24}, \ldots]$$

The above vector can be replaced with the following vector which requires approximately 64/3 exp calculations:

$$w'=[e^{j\theta \cdot 31}, e^{j\theta \cdot 31}, e^{j\theta \cdot 31}, e^{j\theta \cdot 28}, e^{j\theta \cdot 28}, e^{j\theta \cdot 28}, e^{j\theta \cdot 25}, e^{j\theta \cdot 25}, e^{j\theta \cdot 25}, \ldots]$$

If the vector above is used for a large number of OFDM symbols, the deviations from the original vector will become increasingly higher since subcarriers 0, 3, 6, ... are constantly undercompensated (i.e. rotated by a smaller angle than necessary to achieve complete compensation) and subcarriers 2, 5, 8, ... are constantly overcompensated (i.e. rotated by a larger angle than necessary to achieve complete compensation). To alleviate this problem, a periodic index can be used for k as a function of the OFDM symbol number. For example, for the first OFDM symbol the following compensation vector can be used:

$$w=[e^{j\theta \cdot 33}, e^{j\theta \cdot 30}, e^{j\theta \cdot 30}, e^{j\theta \cdot 30}, e^{j\theta \cdot 27}, e^{j\theta \cdot 27}, e^{j\theta \cdot 27}, e^{j\theta \cdot 24}, e^{j\theta \cdot 24}, \ldots]$$

For the second OFDM symbol, the compensation vector will be:

$$w=[e^{j\theta \cdot 32}, e^{j\theta \cdot 32}, e^{j\theta \cdot 29}, e^{j\theta \cdot 29}, e^{j\theta \cdot 29}, e^{j\theta \cdot 26}, e^{j\theta \cdot 26}, e^{j\theta \cdot 26}, e^{j\theta \cdot 23}, \ldots]$$

And for the third OFDM symbol:

$$w=[e^{j\theta \cdot 31}, e^{j\theta \cdot 31}, e^{j\theta \cdot 31}, e^{j\theta \cdot 28}, e^{j\theta \cdot 28}, e^{j\theta \cdot 28}, e^{j\theta \cdot 25}, e^{j\theta \cdot 25}, e^{j\theta \cdot 25}, \ldots]$$

This method ensures that for every 3 OFDM symbols, the average rotation due to compensation on subcarrier with index k is ($\theta \kappa$). In general, for an odd number of subcarrier grouping size N, the value of subcarrier index k' can be calculated from the following equation $$k' = \text{round}\left(\frac{k - \text{mod}(i, N)}{N}\right)N + \text{mod}(i, N)$$

where k is the original index, i is the (zero-indexed) OFDM symbol number.

To avoid calculating the above equation in every OFDM symbol, the indices can be stored in a N×K matrix and retrieved cyclically by using row mod(i, N) for OFDM symbol i.

In accordance with an embodiment of the present invention, Taylor series approximation as can be employed in place of the exp function described herein (e.g. in connection with the block 516) and to thereby perform CFO/SCO compensation. For example, such a Tayor series estimation can be given by:

$$e^x = \sum_{n=0}^{\infty} \frac{x^n}{n!} = 1 + x + \frac{x^2}{2!} + \frac{x^3}{3!} + \ldots \text{ for all } x$$

The foregoing detailed description of the present invention is provided for the purposes of illustration and is not intended to be exhaustive or to limit the invention to the embodiments disclosed. It will be apparent to one skilled in the relevant art that variations will be encompassed by the spirit and scope of the invention and that the invention may be practiced in other embodiments. The particular division of functionality between the various system components described herein is merely exemplary. Thus, the methods and operations presented herein are not inherently related to any particular computer or other apparatus. Functions performed by a single system component may instead be performed by multiple components, and functions performed by multiple components may instead performed by a single component. It will also be apparent that process steps described herein can be embodied in software, firmware or hardware. Thus, the present invention or portions thereof may be implemented by apparatus for performing the operations herein. This apparatus may be specially constructed or configured, such as application specific integrated circuits (ASICs) or Field Programmable Gate Arrays (FPGAs), as a part of an ASIC, as a part of FPGA, or it may comprise a general-purpose computer selectively activated or reconfigured by a computer program stored on a computer readable medium that can be accessed and executed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and or coupled to a computer system bus. Furthermore, the methods described in the specification may be implemented by a single processor or be implemented in architectures employing multiple processor designs for increased computing capability. Accordingly, the disclosure of the present invention is intended to be illustrative, but not limiting, of the scope of the invention. The scope of the present invention is defined by the appended claims.

What is claimed is:

1. A system for estimating clock frequency offset and sampling clock offset in a communication system comprising:
   a receiver configured to receive a communication signal, the communication signal having been transmitted from a transmitter via a communication channel, and the receiver having a signal processor, wherein the signal processor is configured to generate an estimate of a carrier frequency offset and an estimate of a sampling clock offset from the received communication signal by: extracting a vector of pilot symbols from the received signal; performing equalization on the pilot symbols; performing clock frequency offset and sampling clock offset compensation on the pilot symbols; generating the estimate of a carrier frequency offset by estimating a common phase rotation using a first Taylor series approximation; and generating the estimate of the sampling clock offset by estimating phase differences between pairs of pilot symbols using a second Taylor series approximation.

2. The system according to claim 1, wherein the first and second Taylor series approximations are utilized to approximate an inverse tangent function.

3. The system according to claim 2, wherein the receiver performs clock frequency offset and sampling clock offset compensation on the pilot symbols using a third Taylor series approximation of an exponential function.

4. The system according to claim 1, wherein the clock frequency offset and sampling clock offset compensation is performed on the pilot symbols prior to generating the estimate of the carrier frequency offset and the estimate of the sampling clock offset.

5. The system according to claim 1, wherein the signal processor is further configured to generate an estimate of the data symbols encoded onto the communication signal by: extracting a vector of data symbols from the received signal; performing equalization on the data symbols; performing clock frequency offset and sampling clock offset compensation on the data symbols using a compensation vector, wherein the compensation vector is computed using a third Taylor series approximation of an exponential function, the estimate of the carrier frequency offset and the estimate of a sampling clock offset.

6. The system according to claim 5, wherein the receiver performs clock frequency offset and sampling clock offset compensation on the pilot symbols using the compensation vector.

7. The system according to claim 1, wherein the received communication signal is encoded in accordance with orthogonal frequency division multiplexing (OFDM).

8. The system according to claim 1, wherein the estimate of the carrier frequency offset and the estimate of the sampling clock offset are limited to a predetermined range.

9. A system for compensating for clock frequency offset and sampling clock offset in a communication system comprising:
   a receiver configured to receive a communication signal, the communication signal having been transmitted from a transmitter via a communication channel, and the receiver having a signal processor, wherein the signal processor is configured to compensate for carrier frequency offset and for sampling clock offset by: extracting a vector of data symbols from the received signal; performing equalization on the data symbols; multiplying the data symbols by a compensation vector, wherein the compensation vector is computed from an estimate of the carrier frequency offset and an estimate of the sampling clock offset using a Taylor series approximation, and wherein the estimate of the carrier frequency offset is generated by estimating a common phase rotation using a first Taylor series approximation and wherein the estimate of the sampling clock offset is generated by estimating phase differences between pairs of pilot symbols using a second Taylor series approximation.

10. The system according to claim 9, wherein the estimate of the carrier frequency offset and the estimate of the sampling clock offset are limited to a predetermined range.

11. The system according to claim 9, wherein the Tayor series estimation is given by:

$$e^x = \sum_{n=0}^{\infty} \frac{x^n}{n!} = 1 + x + \frac{x^2}{2!} + \frac{x^3}{3!} + \ldots \quad \text{for all} \quad x$$

12. The system according to claim 9, wherein the received communication signal is encoded in accordance with orthogonal frequency division multiplexing (OFDM).

13. The system according to claim 11, wherein N is a number of subcarriers of the communication signal and the compensation vector is computed by performing N/2+1 exp calculation approximations and using $e^{jk}=\text{conj}(e^{-jk})$ where k is a subcarrier index.

14. The system according to claim 11, wherein N is a number of subcarriers of the communication signal and the compensation vector is computed by reusing compensation values for neighboring subcarriers.

15. The system according to claim 13, wherein said reusing compensation values for neighboring subcarriers utilizes a periodic index for the subcarriers and wherein the periodic index is updated as a function of symbol number thereby avoiding repeated under or over compensation of certain subcarriers.

16. The system according to claim 14, wherein the value of a subcarrier index is computed using the following:

$$k' = \text{round}\left(\frac{k - \text{mod}(i, N)}{N}\right)N + \text{mod}(i, N)$$

where k is an original index, and i is a zero-indexed symbol number.

17. The system according to claim 15, wherein the indices are stored in a N×K matrix and retrieved cyclically by using row mod(i, N) for symbol i.

18. A system for estimating and compensating clock frequency offset and sampling clock offset in a communication system comprising:
a receiver configured to receive a communication signal, the communication signal having been transmitted from a transmitter via a communication channel, and the receiver having a signal processor, wherein the signal processor is configured to generate an estimate of an carrier frequency offset and an estimate of a sampling clock offset from the received communication signal by: extracting a vector of pilot symbols from the received signal; performing equalization on the pilot symbols; generating the estimate of a carrier frequency offset by estimating a common phase rotation using a first Taylor series approximation; and generating the estimate of the sampling clock offset by estimating phase differences between pairs of pilot symbols using a second Taylor series approximation and wherein the signal processor is further configured to compensate for carrier frequency offset and for sampling clock offset by: extracting a vector of data symbols from the received signal; performing equalization on the data symbols; and performing compensation using a multiplier for each symbol to form phase corrected symbol, the multiplier representing a common phase offset and a phase offset according to a subcarrier index, wherein N is a number of subcarriers of the communication signal and the multiplier for each symbol is computed by performing N/2+1 exp calculations and using $e^{jk}=\text{conj}(e^{-jk})$ where k is a subcarrier index.

19. The system according to claim 18, wherein the N/2+1 exp calculations are performed using Taylor series approximation.

20. A system for compensating for clock frequency offset and sampling clock offset in a communication system comprising:
a receiver configured to receive a communication signal, the communication signal having been transmitted from a transmitter via a communication channel, and the receiver having a signal processor, wherein the signal processor is configured to compensate for carrier frequency offset and for sampling clock offset by: extracting a vector of frequency domain data symbols from the received signal; performing equalization on the data symbols in the frequency domain; multiplying the data symbols by a compensation vector in the frequency domain, wherein the compensation vector is computed from an estimate of the carrier frequency offset and an estimate of the sampling clock offset using a Taylor series approximation.

21. The system according to claim 20, wherein the estimate of the carrier frequency offset is generated by estimating a common phase rotation using a first Taylor series approximation and wherein the estimate of the sampling clock offset is generated by estimating phase differences between pairs of pilot symbols using a second Taylor series approximation.

22. The system according to claim 20, wherein the estimate of the carrier frequency offset and the estimate of the sampling clock offset are limited to a predetermined range.

23. The system according to claim 20, wherein the Tayor series estimation is given by:

$$e^x = \sum_{n=0}^{\infty} \frac{x^n}{n!} = 1 + x + \frac{x^2}{2!} + \frac{x^3}{3!} + \ldots \quad \text{for all } x$$

24. The system according to claim 20, wherein the received communication signal is encoded in accordance with orthogonal frequency division multiplexing (OFDM).

25. The system according to claim 23, wherein N is a number of subcarriers of the communication signal and the compensation vector is computed by performing N/2+1 exp calculation approximations and using $e^{jk}=\text{conj}(e^{-jk})$ where k is a subcarrier index.

26. The system according to claim 23, wherein N is a number of subcarriers of the communication signal and the compensation vector is computed by reusing compensation values for neighboring subcarriers.

27. The system according to claim 25, wherein said reusing compensation values for neighboring subcarriers utilizes a periodic index for the subcarriers and wherein the periodic index is updated as a function of symbol number thereby avoiding repeated under or over compensation of certain subcarriers.

28. The system according to claim 26, wherein the value of a subcarrier index is computed using the following:

$$k' = \text{round}\left(\frac{k - \text{mod}(i, N)}{N}\right)N + \text{mod}(i, N)$$

where k is an original index, and i is a zero-indexed symbol number.

29. The system according to claim 27, wherein the indices are stored in a N×K matrix and retrieved cyclically by using row mod(i, N) for symbol i.

* * * * *